United States Patent
Cha et al.

(10) Patent No.: US 12,547,844 B2
(45) Date of Patent: Feb. 10, 2026

(54) INTELLIGENT MODEL SELECTION SYSTEM FOR STYLE-SPECIFIC DIGITAL CONTENT GENERATION

(71) Applicant: Accenture Global Solutions Limited, Dublin (IE)

(72) Inventors: Sujeong Cha, Long Island City, NY (US); Anupam Anurag Tripathi, Chicago, IL (US); Sukryool Kang, Dublin, CA (US); Surya Raghavendra Vadlamani, Newtown, PA (US); Andrew Francis Hickl, Sammamish, WA (US); Mohamed Suhail, Santa Clara, CA (US); Peter Royer Smith, Jr., Sharon, CT (US); Jennifer Langusch, New York, NY (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 386 days.

(21) Appl. No.: 18/200,559

(22) Filed: May 22, 2023

(65) Prior Publication Data

US 2024/0370660 A1    Nov. 7, 2024

Related U.S. Application Data

(60) Provisional application No. 63/464,462, filed on May 5, 2023.

(51) Int. Cl.
*G06F 40/40*   (2020.01)
*G06T 11/00*   (2006.01)
*G06V 30/22*   (2022.01)

(52) U.S. Cl.
CPC .............. *G06F 40/40* (2020.01); *G06T 11/00* (2013.01); *G06V 30/22* (2022.01)

(58) Field of Classification Search
CPC .......... G06F 40/40; G06F 40/30; G06T 11/00; G06V 30/22

See application file for complete search history.

(56) References Cited

U.S. PATENT DOCUMENTS

| | | | |
|---|---|---|---|
| 10,732,708 B1* | 8/2020 | Roche | G10L 15/22 |
| 2025/0080601 A1* | 3/2025 | Shevchenko | G10L 15/197 |

OTHER PUBLICATIONS

Annamoradnejad, I. et al., "ColBERT: Using BERT Sentence Embedding in Parallel Neural Networks for Computational Humor," arXiv preprint arXiv, Apr. 27, 2020, 12765, https://arxiv.org/pdf/2104.04108v1.pdf.

(Continued)

*Primary Examiner* — Athar N Pasha
(74) *Attorney, Agent, or Firm* — Mannava & Kang, P.C.

(57) ABSTRACT

Aspects of the present disclosure provide systems, methods, and computer-readable storage media that support intelligent model selection for style-specific digital content generation. For example, a system that provides a digital content generation service may include a trained style detection model may receive reference digital content items from a user and extract a user style embedding that represents a style preference of the user. In some implementations, the reference digital content items may include text documents or images provided or selected by the user. The system may compare the user style embedding to a plurality of model style embeddings that each correspond to a respective generative artificial intelligence (AI) model to generate a ranked list of generative AI models. The system may access one or more highest ranked generative AI models from the ranked list to generate novel digital content based on a prompt from the user.

20 Claims, 5 Drawing Sheets

(56) References Cited

OTHER PUBLICATIONS

Briakou, E. et al., "Olá, Bonjour, Salve! Xformal: A Benchmark for Multilingual Formality Style Transfer," Proceedings of the 2021 Conference of the North American Chapter of the Association for Computational Linguistics: Human Language Technologies, Association for Computational Linguistics, Jun. 2021, pp. 3199-3216, https://aclanthology.org/2021.naacl-main.256.pdf.

Dadu, T. et al., "Towards Detection of Subjective Bias Using Contextualized Word Embeddings" WWW '20: Companion Proceedings of the Web Conference 2020, Association for Computing Machinery, Apr. 2020, pp. 75-76, https://arxiv.org/abs/2002.06644.

Georgakopoulos, S. V. et al., "Convolutional Neural Networks for Toxic Comment Classification," Proceedings of the 10th Hellenic Conference on Artificial Intelligence, Jul. 9, 2018, pp. 1-6, https://arxiv.org/pdf/1802.09957v1.pdf.

Madaan, A. et al., "Politeness Transfer: A Tag and Generate Approach," Proceedings of the 58th Annual Meetng of the Association for Computational Linguistics, Association for Computational Linguistics, Jul. 2020, pp. 1869-1881, https://aclanthology.org/2020.acl-main.169.

Rao, S. et al., "Dear Sir or Madam, May I Introduce the GYAFC Dataset: Corpus, Benchmarks and Metrics for Formality Style Transfer," Proceedings of the 2018 Conference of the North American Chapter of the Association for Computational Linguistics: Human Language Technologies, vol. 1, Association for Computational Linguistics, Jun. 2018, pp. 129-140, https://aclanthology.org/N18-1012.

Sepehri, A. et al., "PassivePy: A Tool to Automatically Identify Passive Voice in Big Text Data," Journal of Consumer Psychology, Society for Consumer Psychology, Jul. 12, 2023, 41 pages, https://psyarxiv.com/bwp3t/.

Thorne, J. et al., "FEVER: A Large-Scale Dataset for Fact Extraction and Verification," Proceedings of the 2018 Conference of the North American Chapter of the Association for Computational Linguistics: Human Language Technologies, vol. 1, Association for Computational Linguistics, Jun. 2018, pp. 809-819, https://aclanthology.org/N18-1074.

\* cited by examiner

INTELLIGENT MODEL SELECTION SYSTEM FOR STYLE-SPECIFIC DIGITAL CONTENT GENERATION

CROSS-REFERENCE TO RELATED APPLICATIONS

The present application claims the benefit of priority from U.S. Provisional Application No. 63/464,462 filed May 5, 2023 and entitled, "SYSTEM FOR STYLE-SPECIFIC DIGITAL CONTENT GENERATION USING ARTIFICIAL INTELLIGENCE," the disclosure of which is incorporated by reference herein in its entirety.

TECHNICAL FIELD

The present disclosure relates generally to an intelligent model selection system for style-specific digital content generation. Particular implementations leverage a trained style detection model to analyze and determine user style preferences from reference digital content items for use in selecting stylistically similar generative artificial intelligence (AI) models for generating digital content.

BACKGROUND

As technology advances, research and commercial interest in artificial intelligence and machine learning technologies continues to grow. For example, artificial intelligence is being leveraged to solve challenges in a variety of fields, such as internet searching, document analysis, cybersecurity, image recognition, and many others. One particular area of recent interest in artificial intelligence is generative artificial intelligence ("generative AI"). Unlike other types of artificial intelligence that typically generate a classification or a prediction based on input data, generative AI refers to artificial intelligence models and logic, such as neural networks, that are able to learn patterns from a training data set and generate new and original (e.g., novel) content that is similar to the content of the training data set. For example, generative AI is capable of generating novel text documents, images, and audio given a sufficient training data set and an input prompt or parameters. Using generative AI to create documents, images, or other content may provide cost savings and competitive advantages to entities as compared to manually generating data or purchasing data from some other source. Some researchers expect the popularity of generative AI to grow such that 10% of all data produced in a few years is the result of generative AI. Because of the increased interest in, and demand for, generative AI by the public, multiple entities and organizations have created and market generative AI models for digital content generation. Although the various generative AI models may be designed for the same general purpose (e.g., generating a particular type of digital content), the inner workings and sophistication of different generative AI models may vary significantly, resulting in significant differences in the quality of the generated content in some situations. As such, although there may be many available options for an entity that seeks to integrate generative AI into a workflow, it may be difficult or impossible to determine which generative AI model provides the best fit for a particular use case, without significant research costs and access to proprietary information related to the available generative AI models.

SUMMARY

Aspects of the present disclosure provide systems, devices, methods, and computer-readable storage devices and media that support intelligent model selection for style-specific digital content generation. The aspects described herein enable a system to provide a digital content generation service using a pool of generative artificial intelligence (AI) models to provide novel digital content that is stylistically similar to a user's style preferences. In some aspects, the system may include a trained style detection model that is configured to extract a user style embedding from reference digital content items received from a user. The extracted user style embedding represents a style preference of the user that is determined based on analysis of the reference digital content items, such as text documents or images provided or selected by the user. In a similar manner, the system may provide sample prompts to a plurality of available generative AI models to cause generation of a plurality of sample digital content items, and the style detection model may analyze the sample digital content items to extract model style embeddings for each of the generative AI models, which may be stored at the system. The system may compare the user style embedding to the prestored model style embeddings to generate a ranked list of generative AI models in which the generative AI models are ranked by a similarity metric derived from a comparison of the corresponding model style embeddings and the user style embedding. In some implementations, the similarity metric may be a cosine similarity value. The system may access one or more highest ranked generative AI models from the ranked list to generate novel digital content based on a prompt from the user. For example, the user may provide a prompt to generate a text document, and the system may provide the prompt as input data to a generative AI model that is ranked highest on the ranked list to cause generation of a novel text document that is stylistically similar to one or more reference text documents received from the user. Similar techniques may be applied to rank and leverage other types of generative AI models to generate other types of digital content items, such as novel images, novel audio, novel video, or the like. By providing style-specific digital content generation, aspects described herein may generate digital content items having increased utility and that result in improved user satisfaction, such as by improving the quality of generated digital content, reducing bias in the generated digital content, generating high volumes of use-case specific digital content, and improving generative AI comprehension of abstract concepts.

In a particular aspect, a method for intelligent model selection for style-specific digital content generation includes receiving, by one or more processors, reference data corresponding to one or more reference digital content items that represent a user style preference. The method also includes extracting, by the one or more processors, a user style embedding from the reference data. The method includes ranking, by the one or more processors, a plurality of model style embeddings based on similarity with the user style embedding to generate a ranked list of generative artificial intelligence (AI) models. Each model style embedding of the plurality of model style embeddings corresponds to a respective generative AI model of a plurality of generative AI models configured to generate digital content based on respective input prompts. The method also includes receiving, by the one or more processors, a user input indicating a prompt for content generation. The method includes providing, by the one or more processors, the prompt as input data to one or more highest ranked generative AI models from the ranked list of generative AI models to generate one or more digital content items. The method further includes outputting, by the one or more processors, the one or more digital content items.

In another particular aspect, a system for intelligent model selection for style-specific digital content generation includes a memory and one or more processors communicatively coupled to the memory. The one or more processors are configured to receive reference data corresponding to one or more reference digital content items that represent a user style preference. The one or more processors are also configured to extract a user style embedding from the reference data. The one or more processors are configured to rank a plurality of model style embeddings based on similarity with the user style embedding to generate a ranked list of generative AI models. Each model style embedding of the plurality of model style embeddings corresponds to a respective generative AI model of a plurality of generative AI models configured to generate digital content based on respective input prompts. The one or more processors are also configured to receive a user input indicating a prompt for content generation. The one or more processors are configured to provide the prompt as input data to one or more highest ranked generative AI models from the ranked list of generative AI models to generate one or more digital content items. The one or more processors are further configured to output the one or more digital content items.

In another particular aspect, a non-transitory computer-readable storage device stores instructions that, when executed by one or more processors, cause the one or more processors to perform operations for intelligent model selection for style-specific digital content generation. The operations include receiving reference data corresponding to one or more reference digital content items that represent a user style preference. The operations also include extracting a user style embedding from the reference data. The operations include ranking a plurality of model style embeddings based on similarity with the user style embedding to generate a ranked list of generative AI models. Each model style embedding of the plurality of model style embeddings corresponds to a respective generative AI model of a plurality of generative AI models configured to generate digital content based on respective input prompts. The operations also include receiving a user input indicating a prompt for content generation. The operations include providing the prompt as input data to one or more highest ranked generative AI models from the ranked list of generative AI models to generate one or more digital content items. The operations further include outputting the one or more digital content items.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, and computer-readable storage devices and media that support intelligent model selection for style-specific digital content generation. The aspects described herein enable a system to provide a digital content generation service using a pool of generative artificial intelligence (AI) models to provide novel digital content that is stylistically similar to a user's style preferences. In some aspects, the system may include a trained style detection model that is configured to extract a user style embedding from reference digital content items received from a user. The extracted user style embedding represents a style preference of the user that is determined based on analysis of the reference digital content items, such as text documents or images provided or selected by the user. The system may compare the user style embedding to prestored model style embeddings to generate a ranked list of generative AI models, and the system may access one or more highest ranked generative AI models from the ranked list to generate novel digital content based on a prompt from the user. For example, the user may provide a prompt to generate a digital content item, and the system may provide the prompt as input data to a generative AI model that is ranked highest on the ranked list to cause generation of a novel digital content item that is stylistically similar to one or more reference digital content items received from the user.

Figure 1:
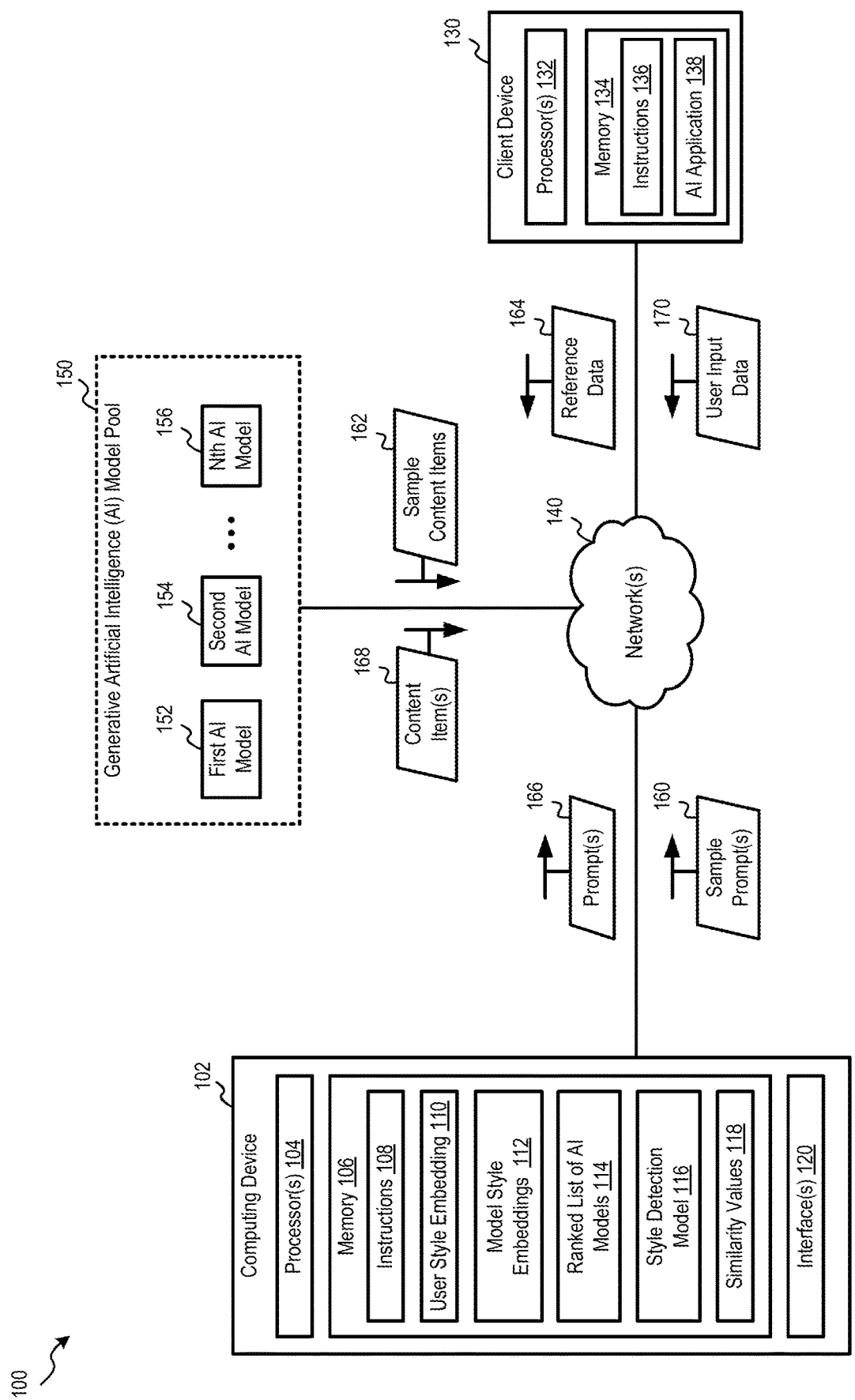
FIG. 1 is a block diagram of an example of a system that supports intelligent model selection for style-specific digital content generation according to one or more aspects.

Referring to FIG. 1, an example of a system that supports intelligent model selection for style-specific digital content generation according to one or more aspects of the present disclosure is shown as a system 100. The system 100 may be configured to analyze reference digital content items provided by a user to determine user style preferences and to select one or more stylistically similar generative artificial intelligence (AI) models from a model pool to generate novel digital content items. As shown in FIG. 1, the system 100 includes a computing device 102, a client device 130, a generative AI model pool 150, and one or more networks 140. In some implementations, the system 100 may include more or fewer components than are shown in FIG. 1, such as additional client devices, generative AI models, or the like, or the generative AI model pool 150 and/or the client device 130 may be omitted (and the corresponding operations performed by the computing device 102), as non-limiting examples.

The computing device 102 may be configured to perform one or more operations herein to support style-specific generation of digital content using AI. For example, the computing device 102 may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. In the implementation shown in FIG. 1, the computing device 102 includes one or more processors 104, a memory 106, and one or more communication interfaces 120.

It is noted that functionalities described with reference to the computing device 102 are provided for purposes of illustration, rather than by way of limitation and that the exemplary functionalities described herein may be provided via other types of computing resource deployments. For example, in some implementations, computing resources and functionality described in connection with the computing device 102 may be provided in a distributed system using multiple servers or other computing devices, or in a cloud-based system using computing resources and functionality provided by a cloud-based environment that is accessible over a network, such as the one of the one or more networks 140. To illustrate, one or more operations described herein with reference to the computing device 102 may be performed by one or more servers or a cloud-based system that communicates with one or more client or user devices, such as the client device 130.

The one or more processors 104 may include one or more microcontrollers, application specific integrated circuits (ASICs), field programmable gate arrays (FPGAs), central processing units (CPUs) and/or graphics processing units (GPUs) having one or more processing cores, or other circuitry and logic configured to facilitate the operations of the computing device 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the computing device 102 may be stored in the memory 106 as instructions 108 that, when executed by the one or more processors 104, cause the one or more processors 104 to perform the operations described herein with respect to the computing device 102, as described in more detail below. Additionally, the memory 106 may be configured to store a user style embedding 110, model style embeddings 112, a ranked list 114 of generative AI models, a style detection model 116, and similarity values 118. Illustrative aspects of the user style embedding 110, the model style embeddings 112, the ranked list 114, the style detection model 116, and the similarity values 118 are described in more detail below.

The one or more communication interfaces 120 may be configured to communicatively couple the computing device 102 to the one or more networks 140 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the computing device 102 includes one or more input/output (I/O) devices (not shown in FIG. 1) that include one or more display devices, a keyboard, a stylus, one or more touchscreens, a mouse, a trackpad, a microphone, a camera, one or more speakers, haptic feedback devices, or other types of devices that enable a user to receive information from or provide information to the computing device 102. In some implementations, the computing device 102 is coupled to a display device, such as a monitor, a display (e.g., a liquid crystal display (LCD) or the like), a touch screen, a projector, a VR display, an AR display, an XR display, or the like. In some other implementations, the display device is included in or integrated in the computing device 102. Alternatively, the computing device 102 may be configured to provide information to support display at one or more other devices, such as the client device 130, as a non-limiting example.

As briefly described above, the computing device 102 may be communicatively coupled to one or more other devices or systems via the one or more networks 140, such as the client device 130 and models of the generative AI model pool 150. The client device 130 is configured to communicate with the computing device 102 via the one or more networks 140 to enable user interaction with the services provided by the computing device 102. For example, the client device 130 may display information related to providing reference digital content items, providing prompts for digital content generation, selecting generated digital content items, or a combination thereof. The client device 130 may include or correspond to a computing device, such as a desktop computing device, a server, a laptop computing device, a personal computing device, a tablet computing device, a mobile device (e.g., a smart phone, a tablet, a PDA, a wearable device, and the like), a VR device, an AR device, an XR device, a vehicle (or component(s) thereof), an entertainment system, another computing device, or a combination thereof, as non-limiting examples. Although depicted as including a single client device 130, the system 100 is not so limited. For example, the system 100 may include a plurality of client devices 130 that enable multiple users to interact with the services provided by the computing device 102. In the implementation shown in FIG. 1, the client device 130 includes one or more processors 132, a memory 134, and one or more communication interfaces (not shown for convenience).

The one or more processors 132 may include one or more microcontrollers, ASICs, FPGAs, CPUs and/or GPUs having one or more processing cores, or other circuitry and logic configured to facilitate the operations of the client device 130 in accordance with aspects of the present disclosure.

The memory 134 may include RAM devices, ROM devices, EPROM, EEPROM, one or more HDDs, one or more SSDs, flash memory devices, NAS devices, or other memory devices configured to store data in a persistent or non-persistent state. Software configured to facilitate operations and functionality of the computing device 102 may be stored in the memory 134 as instructions 136 that, when executed by the one or more processors 132, cause the one or more processors 132 to perform the operations described herein with respect to the client device 130, as described in more detail below. Additionally, the memory 134 may be configured to store an AI application 138 that, when executed by the one or more processors 132, enable the client device 130 to interact with the computing device 102 and participate in the generative AI content generation services provided by the computing device 102.

The generative AI model pool 150 includes a plurality of generative AI models configured to generate novel digital content items. In the implementation shown in FIG. 1, the generative AI model pool 150 includes a first generative AI model 152, a second generative AI model 154, and an Nth generative AI model 156. In other implementations, the generative AI model pool 150 may include fewer than three or more than three generative AI models (e.g., N may be less than three or greater than three). The generative AI model pool 150 may include or correspond to one or more computing devices, such as one or more servers, one or more networked devices, one or more cloud storage or processing resources, one or more databases, or the like, that are owned or maintained by a single entity or multiple distinct entities. Although illustrated as a single generative AI model pool 150, such a logical grouping is for ease of explanation, and in particular implementations, the generative AI models 152-156 may be organized into multiple pools or other logical groupings, such as based on physical location (e.g., of computing resources associated with the generative AI models), entities that own, maintain, manage, or distribute the generative AI models, groupings of clients of the content generation services provided by the computing device 102, or other logical groupings.

The generative AI models 152-156 may be implemented by one or more trained machine learning (ML) or AI models or logic, which may include or correspond to one or more neural networks (NNs), such as multi-layer perceptron (MLP) networks, convolutional neural networks (CNNs), recurrent neural networks (RNNs), deep neural networks (DNNs), deep learning neural networks (DL networks), long short-term memory (LSTM) NNs, or the like. As another example, the generative AI models 152-156 may include or correspond to one or more support vector machines (SVMs) or other kind of trainable and machine-executable ML or AI models or logic. Additionally or alternatively, the generative AI models 152-156 may be implemented as one or more other types of ML models, decision trees, random forests, regression models, Bayesian networks (BNs), dynamic Bayesian networks (DBNs), naive Bayes (NB) models, Gaussian processes, hidden Markov models (HMMs), regression models, or the like. As used herein, a generative AI model is an AI or machine learning (ML) model that is trained to identify patterns from typically large sets of training data and then to generate new and original data or content (e.g., novel digital content items) that is similar to the training data (e.g., that includes the same or similar patterns identified in the training data sets). Generative AI models output novel digital content, as compared to some other types of AI models or ML models that analyze input data and output a result of the analysis, such as a classification of unlabeled input data, without producing novel digital content items. Examples of generative AI models include large language models (LLMs) and AI image generator models. LLMs generate new and original text content in the style of training text content and based on parameters set by a user. AI image generator models are typically trained on large training sets of images that are labeled with various descriptive features and are capable of generating new and original images based on input parameters or prompts. Although examples described herein are primarily in the context of LLMs or AI image generator models, aspects of the present disclosure may also be applied to other types of generative AI models, such as AI audio generator models, AI video generator models, or other types of digital content generation models.

During operation of the system 100, computing device 102 may generate the model style embeddings 112 to be used to rank generative AI models 152-156 based on user style preferences. In order to generate the model style embeddings 112, computing device 102 may cause generative AI models of the generative AI model pool 150 to generate sample digital content from which the model style embeddings 112 may be extracted. To illustrate, computing device 102 may provide one or more sample prompts 160 to the generative AI model pool 150 for use as input data to the generative AI models 152-156. The sample prompts 160 may include text descriptions of requested digital content items, parameters associated with requested digital content items, or the like, and the generative AI models 152-156 may be configured to generate sample digital content items 162 (e.g., a plurality of sample digital content items) based on the sample prompts 160. For example, the first generative AI model 152 may generate a first digital content item of the sample digital content items 162, the second generative AI model 154 may generate a second digital content item of the sample digital content items 162, and the Nth generative AI model 156 may generate a third digital content item of the sample digital content items 162. The sample digital content items 162 may be text documents, images, audio, video, other digital content types, or a combination thereof, based on the types of digital content that the generative AI models 152-156 are configured to generate. The generative AI models 152-156 may provide the sample digital content items 162 to the computing device 102. Although shown as separate elements of the system 100 from the computing device 102, in some other implementations, one or more generative AI models may be implemented by the computing device 102.

After receiving the sample digital content items 162, the computing device 102 may extract the model style embeddings 112 from the sample digital content items 162. For example, the computing device 102 may analyze the sample digital content items 162 and identify a particular set of one or more features from each of the sample digital content items 162, and these features may be extracted as or be the basis of the model style embeddings 112. To illustrate, the computing device 102 may extract a first model style embedding of the model style embeddings 112 based on features of a first set of the sample digital content items 162 that are generated by the first generative AI model 152 based on the sample prompts 160 from the computing device 102. In this example, the computing device 102 may also extract a second model style embedding of the model style embeddings 112 based on features of a second set of the sample digital content items 162 that are generated by the second generative AI model 154 based on the same sample prompts 160. Similar operations may be performed for other generative AI models of the generative AI model pool 150. To extract the model style embeddings 112, the computing device 102 may provide the sample digital content items 162 as input data to the style detection model 116. The style detection model 116 may include or correspond to a trained AI model that is configured to receive input digital content items and to extract style embeddings from the input digital content items. The style detection model 116 may be implemented by one or more trained ML or AI models or logic, which may include or correspond to one or more NNs, such as MLP networks, CNNs, RNNs, DNNs, DL networks, LSTM NNs, or the like. As another example, the style detection model 116 may include or correspond to one or more SVMs or other kind of trainable and machine-executable ML or AI models or logic. Additionally or alternatively, the style detection model 116 may be implemented as one or more other types of ML models, decision trees, random forests, regression models, BNs, DBNs, NB models, Gaussian processes, HMMs, regression models, or the like.

In some implementations, the generative AI models 152-156 are trained to generate novel text documents as the sample digital content items 162. The text documents may include sentences, social media posts, articles, reports, informational items, emails, text messages, transcripts, search results, text for webpages, chat dialogue, other types of text content, or a combination thereof. In such implementations, the computing device 102 may provide the text documents (i.e., the sample digital content items 162) to the style detection model 116, and the style detection model 116 may be configured to extract style embeddings from text documents, and optionally to generate style feature labels for the text documents. For example, the style detection model 116 may be trained using a training set of labeled text documents and style embeddings to extract style embeddings from input text documents as well as to predict labels for the input text documents. The labels may correspond to or represent one or more style attributes associated with the input text documents. For example, the style attributes may include formal, informal, active, passive, polite, impolite, biased, neutral, offensive, non-offensive, single author, multiple authors, positive humor, negative humor, factual, other attributes, or a combination thereof. In some such implementations, different sets of the sample digital content items 162 may be generated for different style attributes. For example, the computing device 102 may provide a first set of the sample prompts 160 to the generative AI models 152-156, with the first set of the sample prompts 160 corresponding to or being based on a first style attribute (e.g., for a formal style attribute, the first set of the sample prompts 160 may include text documents that have been identified as having a formal style, such as text documents created or reviewed by one or more document specialists or text documents retrieved from a dedicated document source for formal style documents). As another example, the computing device 102 may provide a second set of the sample prompts 160 to the generative AI models 152-156, with the second set of the sample prompts 160 corresponding to or being based on a second style attribute (e.g., for a passive style attribute, the second set of the sample prompts 160 may include text documents that have been identified as having a passive style, such as text documents created or reviewed by one or more document specialists or text documents retrieved from a dedicated document source for passive style documents). A first set of the sample digital content items 162 that are generated based on the first set of the sample prompts 160 may be labeled with the first style attribute and a second set of the sample digital content items 162 that are generated based on the second set of the sample prompts 160 may be labeled with the second style attribute. Additionally, a first set of the model style embeddings 112 (that are generated based on the sample digital content items 162 labeled with the first style attribute) may be labeled with the first style attribute and a second set of the model style embeddings 112 (that are generated based on the sample digital content items 162 labeled with the second style attribute) may be labeled with the second style attribute. In this manner, the model style embeddings 112 may be labeled with style attribute labels for implementations directed to generating text documents. In a similar manner, the style detection model 116 may be trained using training sets that include sets of documents with different style attribute labels (e.g., style feature labels) to train the style detection model 116 to not only extract style embeddings from input text documents, but to also predict style attribute labels for the input text documents. Additional details of a style detection model that is trained to analyze text documents are described further herein with reference to FIG. 3.

In some other implementations, the generative AI models 152-156 are trained to generate novel images as the sample digital content items 162. The images may be illustrated images, artistic-style images, photorealistic images, other types of images, or a combination thereof. In such implementations, the computing device 102 may provide the images (i.e., the sample digital content items 162) to the style detection model 116, and the style detection model 116 may be configured to extract style embeddings from input images. For example, the computing device 102 may provide the sample prompts 160 to the generative AI models 152-156 to generate the sample digital content items 162 (e.g., images that are generated based on the description or parameters in the sample prompts 160), and the style detection model 116 may extracting the model style embeddings 112 from the sample digital content items 162. In some such implementations, the style detection model 116 may include or correspond to a CNN that is pretrained for object detection, and the extracted style embeddings may be a concatenation of Gram matrices generated by one or more convolutional layers of the CNN. Additional details of a style detection model that is trained to analyze images are described further herein with reference to FIG. 4.

When a user accesses the content generation service provided by the computing device 102, a device of the user, such as the client device 130, may communicate with the computing device 102 to facilitate provision of the service. For example, the computing device 102 may provide style-specific digital content generation services to users that provide reference digital content items from which user style preferences may be determined. For example, to access the service provided by the computing device 102, the client device 130 may transmit reference data 164 to the computing device 102. The reference data 164 may correspond to, indicate, or include one or more reference digital content items that represent a user style preference. For example, the reference data 164 may indicate one or more reference digital content items that include text documents, images, audio, video, other digital content items, selections of any of these types of digital content items (e.g., from lists or options provided by the computing device 102), or a combination thereof. As an example, if the user wishes to generate novel text documents, the reference data 164 may indicate one or more text documents generated or provided by the user of the client device 130. As another example, if the user wishes to generate novel images, the reference data 164 may indicate one or more images generated or provided by the user, or in some other implementations, the reference data 164 may indicate selection of one or more options provided by the computing device 102. For example, the computing device 102 may initiate display of multiple reference images, such as images generated by the generative AI models 152-156, images from a search engine, images stored at the computing device 102, other images, or a combination thereof, and the reference data 164 may indicate selection of one or more of the reference images by the user as being stylistically similar to the user's style preferences.

After receiving the reference data 164, the computing device 102 may extract the user style embedding 110 from the reference data 164 (e.g., from the reference digital content items included in or indicated by the reference data 164). Similar to as described above with reference to the model style embeddings 112, the computing device 102 may provide the reference digital content items (e.g., the reference data 164) as input data to the style detection model 116 to generate (e.g., extract) the user style embedding 110. The user style embedding 110 may include or be based on values of the same set of features that the model style embeddings 112 are based on, but this time extracted from the reference data 164 instead of the sample digital content items 162. As explained above, in some implementations in which the style detection model 116 is configured to extract style embeddings from text documents, the style detection model 116 may also output a style feature label that corresponds to the reference data 164 and that indicates a style attribute associated with the text documents of the reference data 164.

After extracting the user style embedding 110 from the reference data 164 (e.g., from the reference digital content items indicated or included in the reference data 164), the computing device 102 may rank the model style embeddings 112 (or a subset thereof) based on similarity with the user style embedding 110 to generate the ranked list 114 of generative AI models. To determine a basis for the ranking, the computing device 102 may compare the user style embedding 110 to one or more of the model style embeddings 112 to generate the similarity values 118. Each of the similarity values 118 indicate a determined similarity between the user style embedding 110 and one of the model style embeddings 112. For example, a first similarity value of the similarity values 118 is determined based on a comparison of a first model style embedding of the model style embeddings 112 to the user style embedding 110, and the first similarity value represents or corresponds to a similarity between a content style associated with a first set of sample digital content items generated by the first generative AI model 152 (e.g., a generative AI model that corresponds to the first model style embedding) and a content style associated with the reference digital content items indicated by the reference data 164. Similarly, a second similarity value of the similarity values 118 is determined based on a comparison of a second model style embedding of the model style embeddings 112 to the user style embedding 110, and the second similarity value represents or corresponds to a similarity between a content style associated with a second set of sample digital content items generated by the second generative AI model 154 (e.g., a generative AI model that corresponds to the second model style embedding) and a content style associated with the reference digital content items indicated by the reference data 164. In some implementations, the similarity values 118 include cosine similarity values. In some such implementations, the cosine similarity values may be determined using an approximate nearest neighbor (ANNOY) search, as further described herein with reference to FIG. 2.

The computing device 102 may rank generative AI models, such as the generative AI models 152-156 of the generative AI model pool 150, based on the corresponding similarity values 118 such that the generative AI models in the ranked list 114 are ordered based on an ordered ranking of the corresponding model style embeddings in order of the corresponding similarity values 118 (e.g., the model style embeddings 112 may be ranked in increasing or decreasing order of corresponding similarity value 118). In some implementations, the computing device 102 compares a subset of the model style embeddings 112 to the user style embedding 110 and the ranked list 114 includes a subset of the generative AI models of the generative AI model pool 150. For example, in implementations in which the generative AI model pool 150 includes LLMs or other text generation models, the computing device 102 compares the user style embedding 110 to a subset of the model style embeddings 112 that have a same style attribute label or style feature label as the user style embedding 110 (e.g., model style embeddings that are labeled with the style attribute of formal may be compared to the user style embedding 110 if the user style embedding 110 is labeled with the formal style attribute by the style detection model 116). In some other implementations in which style embeddings are not organized by style attributes, the computing device 102 may compare an entirety of the model style embeddings 112 to the user style embedding 110 to generate the similarity values 118, and the computing device 102 may rank an entirety of the generative AI models of the generative AI model pool 150 to create the ranked list 114. In implementations in which the similarity values 118 are cosine similarity values, the generative AI models may be ranked by corresponding cosine similarity values. For example, if a first model style embedding that corresponds to the first generative AI model 152 (e.g., that is based on sample digital content items generated by the first generative AI model 152) is associated with a cosine similarity value of 0.76, a second model style embedding that corresponds to the second generative AI model 154 is associated with a cosine similarity value of 0.92, and a third model style embedding that corresponds to the Nth generative AI model 156 is associated with a cosine similarity value of 0.84, the generative AI models 152-156 may be ranked, in the ranked list 114, in the following order: second generative AI model 154; Nth generative AI model 156; first generative AI model 152.

After generating the ranked list 114, the computing device 102 may initiate generation of digital content items by a particular number of highest ranked generative AI models from the ranked list 114. For example, the computing device 102 may request a prompt from the user for the generation of novel digital content, and the client device 130 may transmit user input data 170 to the computing device 102 based on the request. The user input data 170 may indicate a prompt for which digital content is to be generated, such as a text description of the content, one or more parameters, or the like. The prompt (e.g., the user input data 170) may be provided by the client device 130 to the generative AI model pool 150 or may be received by the computing device 102 and routed to the generative AI model pool 150 to a particular number of highest ranked generative AI models from the ranked list 114 to cause the recipient generative AI models to generate one or more digital content items 168. To illustrate, the computing device 102 may transmit selected model identifiers (IDs) 166 to the generative AI model pool 150, and the selected model IDs 166 may indicate the particular generative AI models that are selected for generation of digital content that corresponds to the prompt included in the user input data 170. As an example, if the particular number is two and the first generative AI model 152 and the Nth generative AI model 156 are ranked higher than the second generative AI model 154 in the ranked list 114, the selected model IDs 166 may indicate the first generative AI model 152 and the Nth generative AI model 156 to cause generation of the digital content items 168 based on the prompt included in or indicated by the user input data 170. In some implementations, the particular number is a preset or preconfigured number that can be a fixed value or a value based on the number of available generative AI models, the volume of the reference data 164 received from the client device 130, a number of the prompts received from the user, or another variable. Alternatively, the computing device 102 may request the user to provide a requested number of replies, and the user input data 170 may include or indicate the particular number (e.g., the requested number).

The computing device 102 may receive the digital content items 168 from the generative AI model pool 150 (e.g., from the particular number of generative AI models) and, after optional processing, formatting, and/or locally storing the digital content items 168, the computing device 102 may output the digital content items 168. For example, the computing device 102 may transmit the digital content items 168 to the client device 130 for display and/or storage at the client device 130. Alternatively, instead of being provided to the computing device 102, the digital content items 168 may be provided directly to the client device 130 from the generative AI model pool 150. The client device 130 may display the digital content items 168 and allow the user to approve or reject the digital content items 168. Upon approval, the digital content items 168 may be stored, processed, or otherwise used by the client device 130. Upon rejection, the digital content items 168 may be sent back to the computing device 102, and the computing device may initiate another iteration of digital content generation. In some implementations in which multiple digital content items 168 are provided, the client device 130 may display the digital content items 168 and a user may select one or more of the digital content items 168 as meeting the user's style preferences. In such implementations, the client device 130 may provide the user selection as additional user input data 170 to the computing device 102, and the computing device 102 may update the ranked list 114 of generative AI models based on the user selection. For example, the computing device 102 may increase a ranking or similarity score of the generative AI models selected by the user and/or decrease a ranking or similarity score of the generative AI models that are not selected by the user.

As described above, the system 100 supports style-specific generation of digital content using generative AI models. For example, the computing device 102 may receive the reference data 164 that indicates one or more reference digital content items, such as text documents, images, audio, video, or the like, and by using the style detection model 116, the computing device 102 may extract the user style embedding 110 that represents one or more determined user style preferences. By comparing the user style embedding to the similarly generated model style embeddings 112, the computing device 102 is able to identify one or more particular generative AI models from the generative AI model pool 150 that generate digital content items that are the most stylistically similar to the user style preferences. In this manner, the computing device 102 is able to facilitate the generation of digital content items that are more likely to match a user's style preferences, thereby providing digital content with improved utility as compared to using a single generative AI model or selecting a generative AI model based on other criteria. The user is able to receive this stylistically similar digital content without spending time researching the outputs or underlying technologies of a large number of available generative AI models, thereby providing the user with access to higher quality digital content items with less investment of time, human resources, or financial resources as compared to using other generative AI content technology. Additionally or alternatively, the generative AI model (or subset of generative AI models) that most closely match the user style preferences are identified prior to generation of the new digital content items, thereby reducing the resource use on the generative AI models that are not selected and reducing overhead on the network used for providing the novel digital content items to the user.

Figure 2:
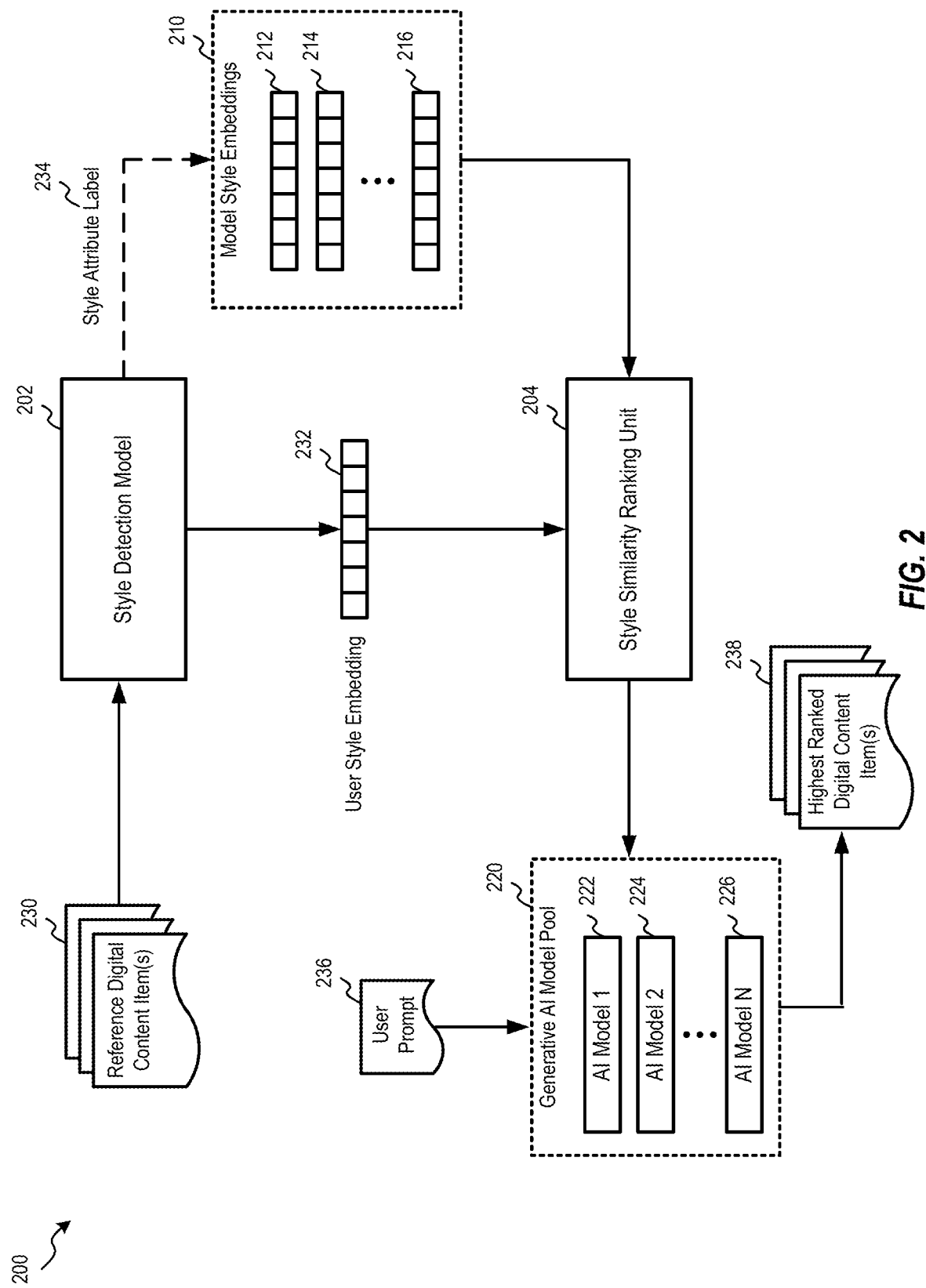
FIG. 2 is a flow diagram illustrating an example process flow for supporting intelligent model selection for style-specific digital content generation according to one or more aspects.

Referring to FIG. 2, an example of a process flow diagram for supporting intelligent model selection for style-specific digital content generation according to one or more aspects is shown as a process flow 200. In some implementations, operations described with reference to the process flow 200 may be performed by one or more components of the system 100 of FIG. 1, such as one or more of the computing device 102, the client device 130, or the generative AI models 152-156 of the generative AI model pool 150.

The process flow 200 includes providing one or more reference digital content items 230 as input data to a style detection model 202. The reference digital content items 230 may include the same type of digital content items for which a user will be requesting style-specific digital content generation, such as text documents (e.g., text files, text responses, etc.), images, audio content items, video content items, or any other type of digital content item capable of being generated by generative AI models.

The style detection model 202 may generate (e.g., extract) a user style embedding 232 based on the reference digital content items 230. For example, the style detection model 202 may include or correspond to one or more trained AI models or trained ML models that are configured to analyze an input digital content item and to generate a style embedding, such as the user style embedding 232 in response to receiving the reference digital content items 230. In some implementations, the style detection model 202 may include or correspond to the style detection model 116 of FIG. 1. The generated style embeddings may include or be based on a set of features extracted from the input digital content item and may be representative of style preferences associated with the input digital content item. In some implementations, the style detection model 202 is configured to extract style embeddings from text documents, and in such implementations the style detection model 202 may include multiple layers configured to perform functions such as natural language processing, mean pooling, and softmax functions, as further described herein with reference to FIG. 3. In some other implementations, the style detection model 202 is configured to extract style embeddings from images, and in such implementations the style detection model 202 may include multiple convolutional layers, as further described herein with reference to FIG. 4.

In some implementations, the style detection model 202 generates a style attribute label 234. For example, the style detection model 202 may be configured to generate style embeddings from input text documents and also to generate style attribute labels from the input text documents. For example, the style detection model 202 may receive an example text document written by a user as the reference digital content items 230, and the style detection model 202 may extract the user style embedding 232 that is representative of style preferences associated with the example text document in addition to the style attribute label 234 that indicates a style attribute of the input text document. The style attribute may be a particular style attribute, or one of multiple different style attributes, such as formal, informal, active voice, passive voice, polite, impolite, biased, neutral, offensive, non-offensive, single author, multiple authors, positive humor, negative humor, factual, or the like. In some implementations, each style attribute label 234 may indicate whether a particular style attribute is present in the input text document. For example, if the style attribute label 234 is a label for a formal style, a first value (e.g., one) may indicate the input text document is determined to have the formal style and a second value (e.g., zero) may indicate that the input text document is determined not to have the formal style. In some other implementations, each style attribute label 234 may indicate the selection of one of two (or more) mutually exclusive style attributes. For example, the style attribute label 234 may include a binary value for which a first value indicates that the input text document has an formal style and a second value indicates that the input text document has an informal style. The number and types of style attributes may be determined based on training data available to train generative AI models. For example, each potential style attribute may be associated with a corresponding training set of text documents that have or are associated with a respective style attribute. The training sets may be generated by an entity that offers the style-specific digital content generation or may be accessed from publicly available data sources, such as online data stores of text documents having particular styles. For example, a first training set may be obtained from a publicly available resource for formal text documents, and a second training set may be obtained from a publicly available resource for passive voice text documents. Examples of publicly available datasets include the Grammarly's Yahoo Answers Formality Corpus (GYAFC), XFORMAL, PassivePy, Wiki Neutrality Corpus (WNC), and the like. The style detection model 202 may be trained using the various training sets to output style attribute labels that indicate detection, or lack of detection, of style attributes that correspond to the training sets. In some implementations, each training set is preprocessed for preparing custom training data and converted to format(s) mandated by the generative AI model providers. After preprocessing, each data point may consist of a text labelled with a style feature attribute (e.g., style attribute label).

The user style embedding 232 and a plurality of model style embeddings 210 may be provided to a style similarity ranking unit 204. The model style embeddings 210 may include style embeddings, similar to the user style embedding 232, that are extracted from sample content from a plurality of generative AI models of a model pool 220. For example, a common set of one or more prompts may be provided to the generative AI models, and for each of the generative AI models, the digital content items generated by the generative AI model may be provided as input to the style detection model 202 to generate (e.g., extract) the corresponding embeddings of the model style embeddings 210. To further illustrate, the model pool 220 may include a first generative AI model 222, a second generative AI model 224, and an Nth generative AI model 226, and the model style embeddings 210 may include a first model style embedding 212 (or first set of model style embeddings) that correspond to the first generative AI model 222, a second model style embedding 214 (or second set of model style embeddings) that correspond to the second generative AI model 224, and an Nth model style embedding 216 (or Nth set of model style embeddings) that correspond to the Nth generative AI model 226. In implementations in which there are not multiple style attributes, an entirety of the model style embeddings 210 may be provided with the user style embedding 232 as input to the style similarity ranking unit 204. In some other implementations in which each generative AI model of the model pool 220 is trained using multiple different training sets for multiple different style attributes, the style attribute label 234 may be used to provide a portion of the model style embeddings 210 that have the same style attribute(s) as detected in the reference digital content items 230.

The style similarity ranking unit 204 may determine a ranked list of the model style embeddings 210 based on the user style embedding 232. For example, the style similarity ranking unit 204 may compare the user style embedding 232 to each of the received model style embeddings 210 to generate a set of similarity values, where each similarity value represents the similarity between the user style embedding 232 and one of the model style embeddings 210 (and therefore a style similarity between the reference digital content items 230 and digital content items generated by a generative AI model from the model pool 220 that corresponds to the model style embedding used to generate the similarity value). In some implementations, the similarity values include cosine similarity values. For example, the style similarity ranking unit 204 may generate a first similarity value (e.g., a first cosine similarity value) based on a comparison of the user style embedding 232 and the first model style embedding 212, a second similarity value based on a comparison of the user style embedding 232 and the second model style embedding 214, and an Nth similarity value based on a comparison of the user style embedding 232 and the Nth model style embedding 216. In this example, the first similarity value represents a similarity between user style preferences (as indicated by the reference digital content items 230) and style qualities associated with output of the first generative AI model 222, the second similarity value represents a similarity between the user style preferences and style qualities associated with output of the second generative AI model 224, and the Nth similarity value represents a similarity between the user style preferences and style qualities associated with output of the Nth generative AI model 226. The style similarity ranking unit 204 may rank the models of the model pool 220 based on the corresponding similarity values. For example, if the Nth similarity value is greater than the first similarity value and the first similarity value is greater than the second similarity value, the style similarity ranking unit 204 may generate a ranked list of generative AI models having the following order: the Nth generative AI model 226 followed by the first generative AI model 222 followed by the second generative AI model 224. The style similarity ranking unit 204 may provide the ranked list as output. In some implementations, the style similarity ranking unit 204 generates cosine similarity values that range from zero (corresponding to dissimilar style embeddings) and one (corresponding to similar style embeddings) using an approximate nearest neighbor (ANNOY) search algorithm. The ANNOY search algorithm is used to search for similar points in space that are closest to a given query point and with static files as indices for faster ranking. To illustrate, the style similarity ranking unit 204 may create an ANNOY indexer with a desired size that specifies the number of trees in the index. The user style embeddings 232 and the model style embeddings 210 may be added to the index. In this example, J hyper planes may be created using ANNOY to split the data points in the index, resulting in the selected number of trees, which each tree being constructed by selecting two points at random in the index and splitting the space into two by their hyperplane. After adding the embeddings, a default angular metric in the index may be mapped to the cosine similarity metric, and the top K embeddings from the ANNOY ranking table may be queried to return a particular number of highest ranked model style embeddings, which correspond to the highest ranked generative AI models. In this manner, the ranked list of generative AI models is generated. In other implementations, the style similarity ranking unit 204 may use a different similarity metric to generate the ranked list of generative AI models.

A user prompt 236 may be provided to one or more highest ranking generative AI models (e.g., of the model pool 220) from the ranked list output by the style similarity ranking unit 204. For example, a user may request generation of digital content based on the user prompt 236, and the user prompt 236 may be provided to a highest ranked generative AI model (or a particular number of highest ranked generative AI models) to generate novel digital content items based on the user prompt 236. In some implementations, the particular number of highest ranked generative AI models is set by the system or the entity that offers the style-specific digital content generation services. In some other implementations, the user may be queried for, and the user may provide, a selected number of different digital content items associated with the user prompt 236. As a non-limiting example, the user prompt 236 may be "Photo of a 50-year old man, silver hair, neat beard, wearing a red gilet, thick rimmed glasses. Provide K possible candidates." In this example, K is the particular number of highest ranked generative AI models, and the other sentence represents a description and parameters for images to be generated by the K highest ranked generative AI models of the model pool 220.

Based on the user prompt 236, the selected generative AI models may generate respective novel digital content items that are output as one or more highest ranked digital content items 238. For example, the highest ranked digital content items 238 may include one or more text documents, one or more images, or other types of digital content that are generated based on the description, instructions, parameters, or the like, of the user prompt 236. In some implementations, the highest ranked digital content items 238 are provided to the user as an end to a transaction provided by the style-specific digital content generation service. In some other implementations, the user may select one of the highest ranked digital content items 238 as the preferred digital content item, or the user may rank the highest ranked digital content items, and the selection or ranking may be used as feedback data to further train the style detection model 202, such as by increasing a weight associated with the selected or highest ranked digital content item or decreasing a weight associated with lower ranked or unselected digital content items.

Figure 3:
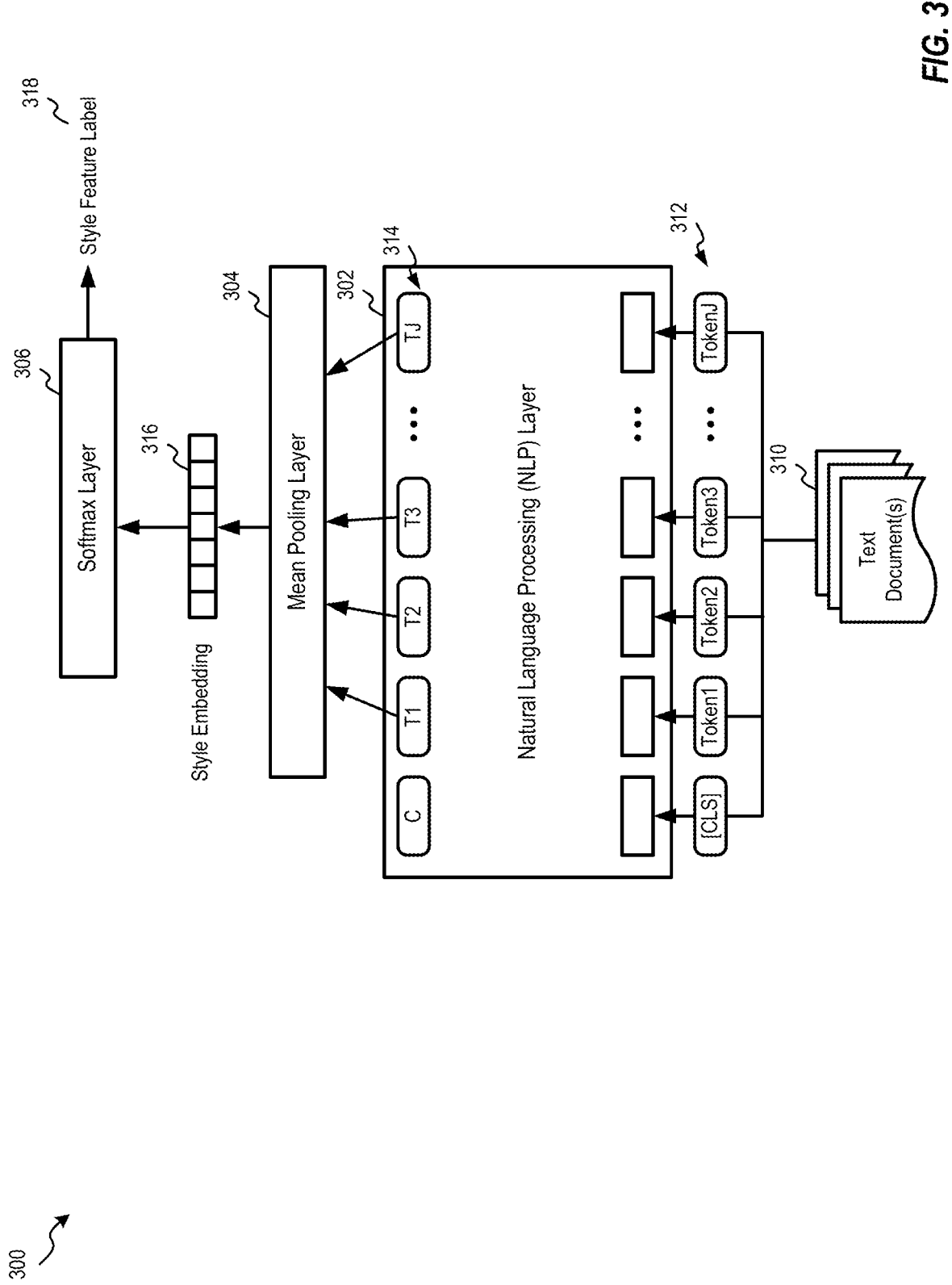
FIG. 3 is a block diagram of an example of a style detection model according to one or more aspects.

Referring to FIG. 3, an example of a style detection model according to one or more aspects of the present disclosure is shown as a style detection model 300. The style detection model 300 may be configured to analyze text documents to extract style embeddings and to identify style attributes. In some implementations, the style detection model 300 may include or correspond to the style detection model 116 of FIG. 1 or the style detection model 202 of FIG. 2. In the example shown in FIG. 3, the style detection model 300 includes a natural language processing (NLP) layer 302, a mean pooling layer 304, and a softmax layer 306.

The NLP layer 302 may be configured to perform natural language processing to generate a plurality of word embeddings 314 based on one or more input text documents 310. For example, the input text documents 310 may be tokenized into a plurality of tokens 312, and the tokens 312 may be provided as input to the NLP layer 302. The NLP layer 302 may include one or more language models, such as encoder networks, stacked encoder networks, unidirectional encoders, bidirectional encoders, transformers, and/or other models trained to perform various NLP tasks such as language inference, text classification, and the like. In some implementations, the NLP layer 302 may be trained using data sets corresponding to different labeled style attributes, and the NLP layer 302 may use a cross entropy loss function for this multi-class classification layer. The mean pooling layer 304 may be configured to generate (e.g., extract) a style embedding 316 from the plurality of word embeddings 314. In some implementations, the mean pooling layer 304 is used to average the output word embeddings 314, thereby creating a fixed-size output representation for input sentences of varying lengths. The softmax layer 306 may be configured to generate one or more style feature labels 318 based on the style embedding 316. For example, the softmax layer 306 may return a probability distribution of style attribute categories from zero to one for the style embedding 316. As described above with reference to FIG. 1, the style detection model 300 may receive as input either reference text documents from a user or sample text documents from generative AI models in order to output user style embeddings or model style embeddings, respectively.

Figure 4:
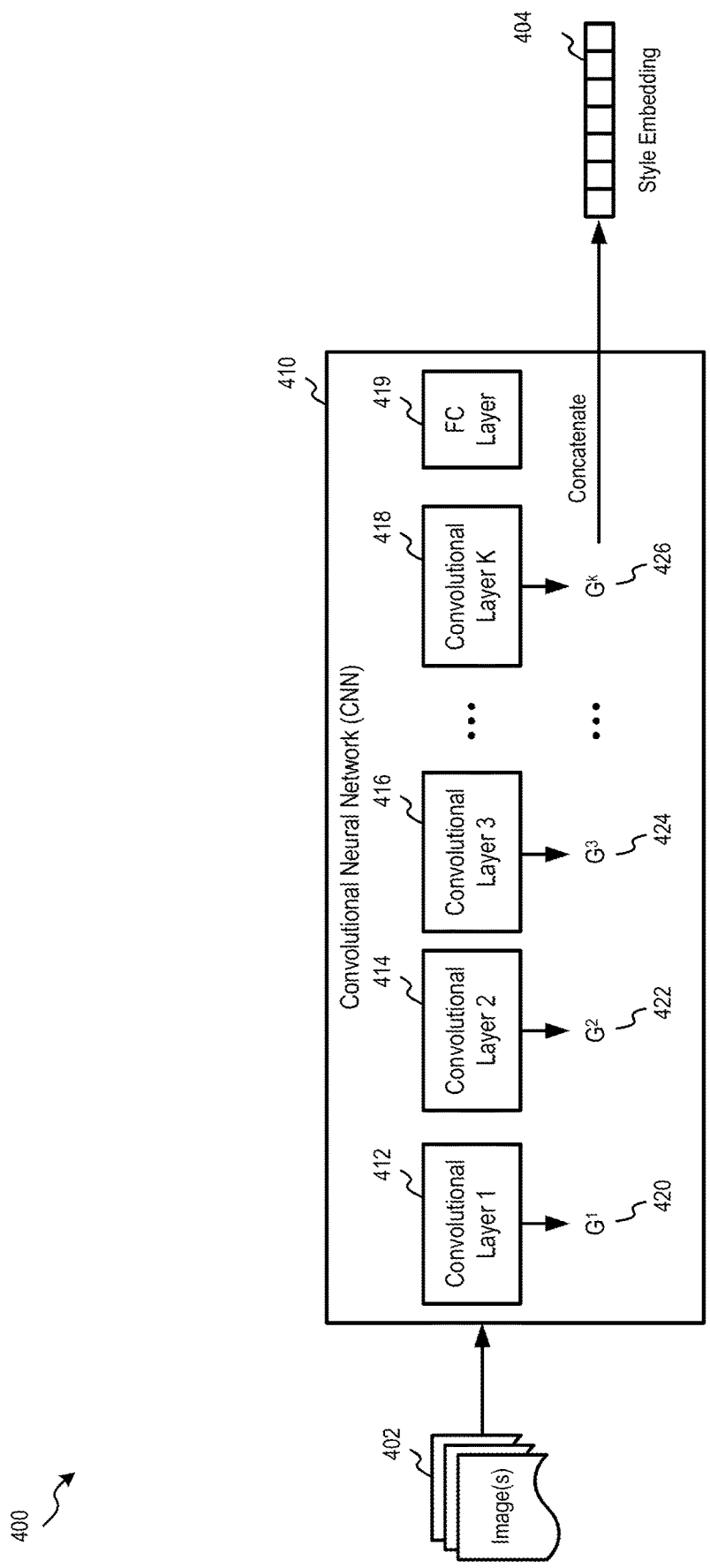
FIG. 4 is a block diagram of another example of a style detection model according to one or more aspects.

Referring to FIG. 4, an example of a style detection model according to one or more aspects of the present disclosure is shown as a style detection model 400. The style detection model 400 may be configured to analyze images to extract style embeddings. In some implementations, the style detection model 400 may include or correspond to the style detection model 116 of FIG. 1 or the style detection model 202 of FIG. 2. In the implementation shown in FIG. 4, the style detection model 400 includes a convolutional neural network (CNN) 410 that includes a first convolutional layer 412 ("Convolutional Layer 1"), a second convolutional layer 414 ("Convolutional Layer 2"), a third convolutional layer 416 ("Convolutional Layer 3"), a Kth convolutional layer 418 ("Convolutional Layer K"), and a fully connected (FC) layer 419. Although the CNN 410 is shown as including four convolutional layers in FIG. 4, in other implementations, the CNN 410 may include fewer than four or more than four convolutional layers (e.g., K may be fewer than four or more than four).

The CNN 410 may be configured to generate (e.g., extract) a style embedding 404 from one or more reference images 402. In some implementations, the CNN 410 may be pre-trained for object detection, and feature maps output by the convolutional layers 412-418 may be used to determine the style embedding 404. For example, the style embedding 404 may be based on a plurality of Gram matrices computed based on outputs of the convolutional layers 412-418. A Gram matrix G is the inner product of a feature matrix F, output by a convolutional layer, and its transpose FT. A Gram Matrix measures the correlation between the feature maps and is considered as a style representation for an image, which is often used in Neural Style Transfer. To illustrate, the first convolutional layer 412 may output a first Gram matrix 420 ("$G^1$"), the second convolutional layer 414 may output a second Gram matrix 422 ("$G^2$"), the third convolutional layer 416 may output a third Gram matrix 424 ("$G^3$"), the Kth convolutional layer 418 may output a Kth Gram matrix 426 ("$G^K$"), and the style embedding 404 may be generated by concatenating the first Gram matrix 420, the second Gram matrix 422, the third Gram matrix 424, and the Kth Gram matrix 426. Although described as outputting the Gram matrices, the convolutional layers 412-418 may output feature maps that, along with their respective transposes, are used to derive the Gram matrices 420-426. In some implementations, concatenating the Gram matrices 420-426 may include performing principal component analysis (PCA) on the Gram matrices 420-426 to reduce the respective dimensions. As described above with reference to FIG. 1, the style detection model 400 may receive as input either reference images from (or selected by) a user or sample images from generative AI models in order to output user style embeddings or model style embeddings, respectively.

Figure 5:
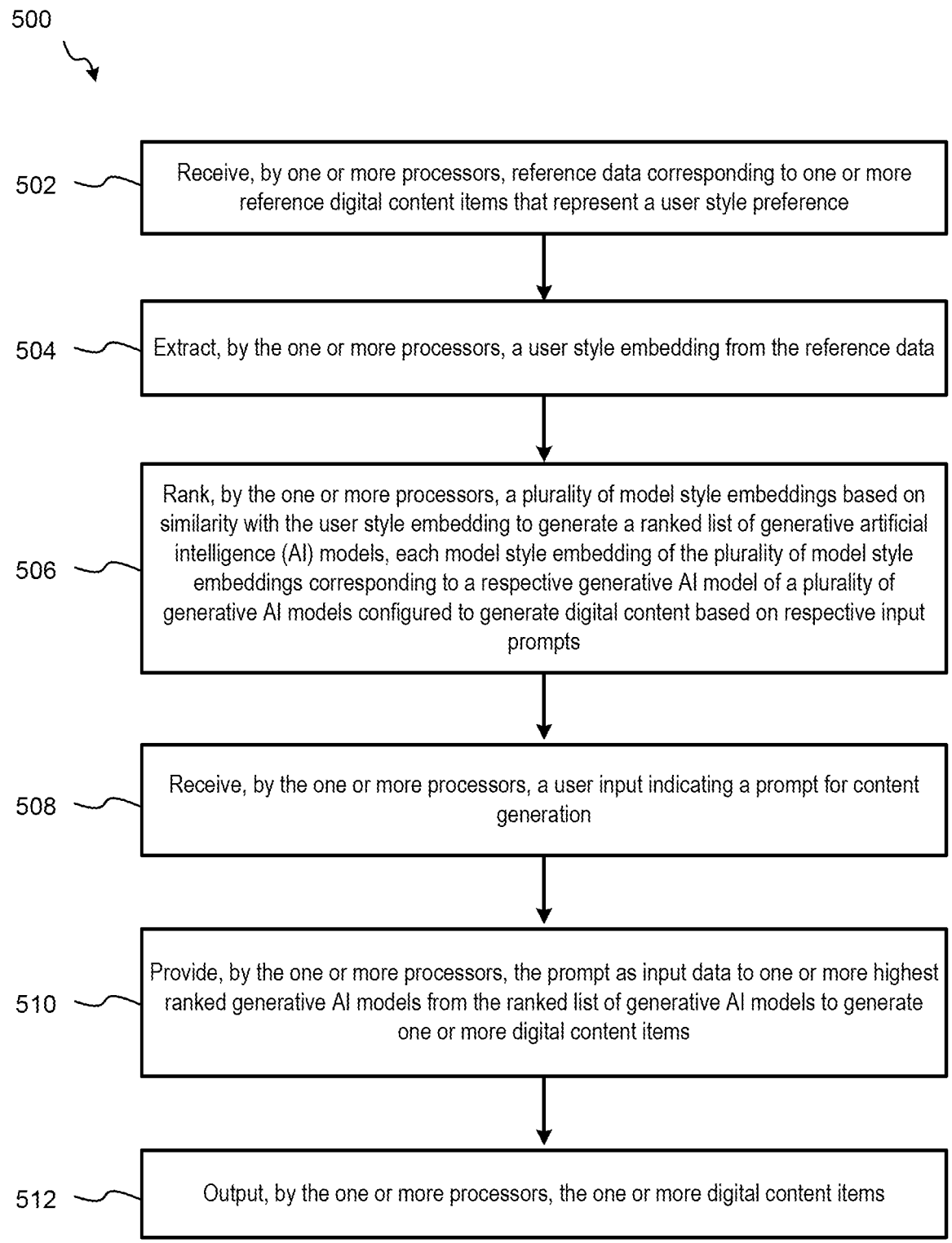
FIG. 5 is a flow diagram illustrating an example of a method for supporting intelligent model selection for style-specific digital content generation according to one or more aspects.

Referring to FIG. 5, a flow diagram of an example of a method for supporting intelligent model selection for style-specific generation of digital content according to one or more aspects is shown as a method 500. In some implementations, the operations of the method 500 may be stored as instructions that, when executed by one or more processors (e.g., the one or more processors of a computing device or a server), cause the one or more processors to perform the operations of the method 500. In some implementations, these instructions may be stored on a non-transitory computer-readable storage device or a non-transitory computer-readable storage medium. In some implementations, the method 500 may be performed by a computing device, such as the computing device 102 of FIG. 1 (e.g., a device configured for intelligent model selection for style-specific generation of digital content), the client device 130 of FIG. 1, the generative AI models 152-156 of the generative AI model pool 150 of FIG. 1, the style detection model 202 of FIG. 2, the style similarity ranking unit 204 of FIG. 2, the generative AI models 222-226 of the model pool 220 of FIG. 2, the style detection model 300 of FIG. 3, the style detection model 400 of FIG. 4, or a combination thereof.

The method 500 includes receiving reference data corresponding to one or more reference digital content items that represent a user style preference, at 502. For example, the reference data may include or correspond to the reference data 164 of FIG. 1. The method 500 includes extracting a user style embedding from the reference data, at 504. For example, the user style embedding may include or correspond to the user style embedding 110 of FIG. 1.

The method 500 includes ranking a plurality of model style embeddings based on similarity with the user style embedding to generate a ranked list of generative AI models, at 506. Each model style embedding of the plurality of model style embeddings corresponds to a respective generative AI model of a plurality of generative AI models configured to generate digital content based on respective input prompts. For example, the model style embeddings may include or correspond to the model style embeddings 112 of FIG. 1, the ranked list of generative AI models may include or correspond to the ranked list 114 of FIG. 1, and the plurality of generative AI models may include or correspond to the generative AI models 152-156 of the generative AI model pool 150 of FIG. 1. The method 500 includes receiving a user input indicating a prompt for content generation, at 508. For example, the user input may include or correspond to the user input data 170 of FIG. 1.

The method 500 includes providing the prompt as input data to one or more highest ranked generative AI models from the ranked list of generative AI models to generate one or more digital content items, at 510. For example, the prompt may include or correspond to the user input data 170 of FIG. 1, and the one or more highest ranked generative AI models may be indicated by the selected model IDs 166 of FIG. 1. The method 500 includes outputting the one or more digital content items, at 512. For example, the one or more digital content items may include or correspond to the digital content items 168 of FIG. 1.

In some implementations, the method 500 also includes determining, for one or more model style embeddings of the plurality of model style embeddings, a respective cosine similarity value based on a comparison of the model style embedding and the user style embedding. In such implementations, the method 500 further includes ranking each of the one or more model style embeddings based on the respective cosine similarity value. For example, the cosine similarity values may include or correspond to the similarity values 118 of FIG. 1, and the ranked list 114 may be determined based on the similarity values 118. Additionally or alternatively, the method 500 may also include receiving a user selection of one of the one or more digital content items and updating the ranked list of generative AI models based on the user selection. For example, the user selection may include or correspond to the user input data 170 of FIG. 1.

In some implementations, the method 500 also includes providing one or more prompts as sample input data to the plurality of generative AI models to generate a plurality of sample digital content items and extracting the plurality of model style embeddings from the plurality of sample digital content items. For example, the one or more prompts may include or correspond to the sample prompts 160 of FIG. 1, and the plurality of sample digital content items may include or correspond to the sample digital content items 162 of FIG. 1. Additionally or alternatively, extracting the plurality of model style embeddings may include extracting a first model style embedding based on features of a first set of sample digital content items of the plurality of sample digital content items and extracting a second model style embedding based on features of a second set of sample digital content items of the plurality of sample digital content items. The first set of sample digital content items are generated by a first generative AI model based on the one or more prompts. The second set of sample digital content items are generated by a second generative AI model based on the one or more prompts. For example, a first set of the model style embeddings 112 may be extracted from a portion of the sample digital content items 162 that are generated by the first generative AI model 152 of FIG. 1, and a second set of the model style embeddings 112 may be extracted from a portion of the sample digital content items 162 that are generated by the second generative AI model 154 of FIG. 1. Additionally or alternatively, a similarity between the first model style embedding and the second model style embedding corresponds to a similarity between a first content style associated with the first set of sample digital content items and a second content style associated with a second set of sample digital content items. For example, similarities between the model style embeddings 112 of FIG. 1 may correspond to similarity between content styles associated with the corresponding generative AI models of the generative AI model pool 150.

In some implementations, the one or more reference digital content items include one or more reference text documents, the one or more digital content items include one or more text documents, and the plurality of generative AI models are trained to generate novel text documents. In some such implementations, extracting the user style embedding includes providing the reference data as input to a trained style detection model that is configured to generate style embeddings and style feature labels for input text documents. For example, the trained style detection model may include or correspond to the style detection model 116 of FIG. 1, the style detection model 202 of FIG. 2, or the style detection model 300 of FIG. 3. The style embeddings may include feature vectors extracted from the input text documents and the style feature labels may include labels of one or more style attributes associated with the input text documents. In some such implementations, the trained style detection model is trained to generate the style feature labels based on style-specific training datasets that correspond to the one or more style attributes, and the one or more style attributes include formal, informal, active, passive, polite, impolite, biased, neutral, offensive, non-offensive, single author, multiple authors, positive humor, negative humor, factual, or a combination thereof. For example, the style detection model may be trained on style-specific datasets, as described above with reference to FIG. 2. Additionally or alternatively, the method 500 further includes, for each style attribute of the one or more style attributes, providing a set of prompts that correspond to the style attribute as sample input data to the plurality of generative AI models to generate a plurality of sample text documents and extracting model style embeddings that correspond to the style attribute from the plurality of sample text documents. For example, the sample prompts 160 of FIG. 1 may be logically organized based on style attribute labels, and the model style embeddings 112 may correspond to the same style attribute labels. Additionally or alternatively, the trained style detection model may include a NLP layer configured to generate a plurality of word embeddings based on an input text document, a mean pooling layer configured to generate a style embedding based on the plurality of word embeddings, and a softmax layer configured to generate one or more style feature labels based on the style embedding. For example, the NLP layer may include or correspond to the NLP layer 302 of FIG. 3, the mean pooling layer may include or correspond to the mean pooling layer 304 of FIG. 3, and the softmax layer may include or correspond to the softmax layer 306 of FIG. 3

In some implementations, the one or more reference digital content items include one or more reference images, the one or more digital content items include one or more images, and the plurality of generative AI models are trained to generate novel images. In some such implementations, extracting the user style embedding includes providing the reference data as input to a trained style detection model that is configured to generate style embeddings for input images. For example, the trained style detection model may include or correspond to the style detection model 116 of FIG. 1, the style detection model 202 of FIG. 2, or the style detection model 400 of FIG. 4. In some such implementations, the method 500 further includes providing a set of sample prompts as sample input data to the plurality of generative AI models to generate a plurality of sample images and extracting the plurality of model style embeddings from the plurality of sample images. For example, the set of sample prompts may include or correspond to the sample prompts 160 of FIG. 1, and the plurality of sample images may include or correspond to the sample digital content items 162 of FIG. 1. Additionally or alternatively, the trained style detection model may include a CNN that includes a plurality of convolutional layers, and a style embedding for an input image may be based on a plurality of Gram matrices computed based on outputs of the plurality of convolutional layers. For example, the CNN may include or correspond to the CNN 410 of FIG. 4, the plurality of convolutional layers may include or correspond to the convolutional layers 412-418 of FIG. 4, and the plurality of Gram matrices may include or correspond to the plurality of Gram matrices 420-426 of FIG. 4. Additionally or alternatively, the method 500 may further include initiating display of a plurality of reference images for selection by a user to indicate the user style preference and receiving a user selection of the one or more reference images from the plurality of reference images. For example, the user selection may include or correspond to the user input data 170 of FIG. 1.

It is noted that other types of devices and functionality may be provided according to aspects of the present disclosure and discussion of specific devices and functionality herein have been provided for purposes of illustration, rather than by way of limitation. It is noted that the operations of the process flow 200 of FIG. 2 and the method 500 of FIG. 5 may be performed in any order. Additionally or alternatively, one or more operations described with reference to the process flow 200 of FIG. 2 or the method 500 may be performed during performance of another of the method 500 of FIG. 5 or the process flow 200 of FIG. 2. It is also noted that the process flow 200 of FIG. 2 or the method 500 of FIG. 5 may also include other functionality or operations consistent with the description of the operations of the system 100 of FIG. 1, the style detection model 300 of FIG. 3, or the style detection model 400 of FIG. 4.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-5) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for intelligent model selection for style-specific digital content generation, the method comprising:
   training, by one or more processors, a style detection model including a neural network using training data that includes labelled digital content items of different styles and corresponding style embeddings;
   receiving, by one or more processors, reference data corresponding to one or more reference digital content items that represent a user style preference;
   extracting, by the one or more processors using the trained style detection model, a user style embedding from the reference data;
   ranking, by the one or more processors, a plurality of model style embeddings based on similarity with the user style embedding to generate a ranked list of generative artificial intelligence (AI) models,
      wherein each model style embedding of the plurality of model style embeddings corresponds to a respective generative AI model of a plurality of generative AI models configured to generate digital content based on respective input prompts;
   receiving, by the one or more processors, a user input indicating a prompt for content generation;
   providing, by the one or more processors, the prompt as input data to one or more highest ranked generative AI models from the ranked list of generative AI models to generate one or more digital content items; and
   outputting, by the one or more processors, the one or more digital content items.

2. The method of claim 1, wherein ranking the plurality of model style embeddings comprises:
   determining, by the one or more processors, for one or more model style embeddings of the plurality of model style embeddings, a respective cosine similarity value based on a comparison of the model style embedding and the user style embedding; and
   ranking, by the one or more processors, each of the one or more model style embeddings based on the respective cosine similarity value.

3. The method of claim 1, further comprising:
   providing, by the one or more processors, one or more prompts as sample input data to the plurality of generative AI models to generate a plurality of sample digital content items; and
   extracting, by the one or more processors, the plurality of model style embeddings from the plurality of sample digital content items.

4. The method of claim 3, wherein extracting the plurality of model style embeddings comprises:
   extracting, by the one or more processors, a first model style embedding based on features of a first set of sample digital content items of the plurality of sample digital content items, the first set of sample digital content items generated by a first generative AI model based on the one or more prompts; and
   extracting, by the one or more processors, a second model style embedding based on features of a second set of sample digital content items of the plurality of sample digital content items, the second set of sample digital content items generated by a second generative AI model based on the one or more prompts.

5. The method of claim 4, wherein a similarity between the first model style embedding and the second model style embedding corresponds to a similarity between a first content style associated with the first set of sample digital content items and a second content style associated with the second set of sample digital content items.

6. The method of claim 1, wherein the one or more reference digital content items comprise one or more reference text documents, wherein the one or more digital content items comprise one or more text documents, and wherein the plurality of generative AI models are trained to generate novel text documents.

7. The method of claim 6, wherein extracting the user style embedding comprises:
   providing, by the one or more processors, the reference data as input to the trained style detection model that is configured to generate style embeddings and style feature labels for input text documents, the style embeddings comprising feature vectors extracted from the input text documents and the style feature labels comprising labels of one or more style attributes associated with the input text documents.

8. The method of claim 7, wherein the trained style detection model is trained to generate the style feature labels based on style-specific training datasets that correspond to the one or more style attributes, and wherein the one or more style attributes comprise formal, informal, active, passive, polite, impolite, biased, neutral, offensive, non-offensive, single author, multiple authors, positive humor, negative humor, factual, or a combination thereof.

9. The method of claim 7, further comprising, for each style attribute of the one or more style attributes:
providing, by the one or more processors, a set of prompts that correspond to the style attribute as sample input data to the plurality of generative AI models to generate a plurality of sample text documents; and
extracting, by the one or more processors, model style embeddings that correspond to the style attribute from the plurality of sample text documents.

10. The method of claim 1, wherein the one or more reference digital content items comprise one or more reference images, wherein the one or more digital content items comprise one or more images, and wherein the plurality of generative AI models are trained to generate novel images.

11. The method of claim 10, wherein extracting the user style embedding comprises:
providing, by the one or more processors, the reference data as input to the trained style detection model that is configured to generate style embeddings for input images;
providing, by the one or more processors, a set of sample prompts as sample input data to the plurality of generative AI models to generate a plurality of sample images; and
extracting, by the one or more processors, the plurality of model style embeddings from the plurality of sample images.

12. The method of claim 1, further comprising:
generating, by the one or more processors, corresponding custom training data sets for different style attributes, wherein each custom training data set of the corresponding custom training data sets includes a set of digital content items associated with a style attribute label of one of the different style attributes;
converting, by the one or more processors, the corresponding custom training data sets into formats mandated for plurality of generative AI models;
training, by the one or more processors, the plurality of generative AI models on at least one of the custom training data sets based on the mandated formats.

13. A system for intelligent model selection for style-specific digital content generation, the system comprising:
a memory; and
one or more processors communicatively coupled to the memory, the one or more processors configured to:
train a style detection model including a neural network using training data that includes labelled digital content items of different styles and corresponding style embeddings;
receive reference data corresponding to one or more reference digital content items that represent a user style preference;
extract, using the trained style detection model, a user style embedding from the reference data;
rank a plurality of model style embeddings based on similarity with the user style embedding to generate a ranked list of generative artificial intelligence (AI) models,
wherein each model style embedding of the plurality of model style embeddings corresponds to a respective generative AI model of a plurality of generative AI models configured to generate digital content based on respective input prompts;
receive a user input indicating a prompt for content generation;
provide the prompt as input data to one or more highest ranked generative AI models from the ranked list of generative AI models to generate one or more digital content items; and
output the one or more digital content items.

14. The system of claim 13, wherein the one or more processors are further configured to:
provide the reference data as input to the trained style detection model that is configured to generate style embeddings and style feature labels for input text documents, the style embeddings comprising feature vectors extracted from the input text documents and the style feature labels comprising labels of one or more style attributes associated with the input text documents.

15. The system of claim 14, wherein the trained style detection model comprises:
a natural language processing (NLP) layer configured to generate a plurality of word embeddings based on the input text documents;
a mean pooling layer configured to generate a style embedding based on the plurality of word embeddings; and
a softmax layer configured to generate one or more style feature labels based on the style embedding.

16. The system of claim 13, wherein the one or more processors are further configured to:
provide the reference data as input to the trained style detection model that is configured to generate style embeddings for input images.

17. The system of claim 16, wherein the trained style detection model comprises a convolutional neural network (CNN) that includes a plurality of convolutional layers, and wherein a style embedding for an input image is based on a plurality of Gram matrices computed based on outputs of the plurality of convolutional layers.

18. A non-transitory computer-readable storage device comprising instructions that, when executed by one or more processors, cause the one or more processors to perform operations for intelligent model selection for style-specific digital content generation, the operations comprising:
training a style detection model including a neural network using training data that includes labelled digital content items of different styles and corresponding style embeddings;
receiving reference data corresponding to one or more reference digital content items that represent a user style preference;
extracting, using the trained style detection model, a user style embedding from the reference data;
ranking a plurality of model style embeddings based on similarity with the user style embedding to generate a ranked list of generative artificial intelligence (AI) models,
wherein each model style embedding of the plurality of model style embeddings corresponds to a respective generative AI model of a plurality of generative AI models configured to generate digital content based on respective input prompts;
receiving a user input indicating a prompt for content generation;

providing the prompt as input data to one or more highest ranked generative AI models from the ranked list of generative AI models to generate one or more digital content items; and outputting the one or more digital content items.

19. The non-transitory computer-readable storage device of claim 18, wherein the operations further comprise:

receiving a user selection of one of the one or more digital content items; and updating the ranked list of generative AI models based on the user selection.

20. The non-transitory computer-readable storage device of claim 18, wherein the one or more reference digital content items comprise one or more reference images, and wherein the operations further comprise:

initiating display of a plurality of reference images for selection by a user to indicate the user style preference; and receiving a user selection of the one or more reference images from the plurality of reference images.

* * * * *